(12) United States Patent
Ashtekar et al.

(10) Patent No.: US 10,541,520 B1
(45) Date of Patent: Jan. 21, 2020

(54) INTERLOCK SYSTEM FOR AN ELECTRICAL INSTALLATION

(71) Applicant: EATON INTELLIGENT POWER LIMITED, Dublin (IE)

(72) Inventors: Koustubh Dnyandeo Ashtekar, Moon Township, PA (US); Logan D. Weigle, McKees Rocks, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 16/193,125

(22) Filed: Nov. 16, 2018

(51) Int. Cl.
| | |
|---|---|
| *H02B 11/133* | (2006.01) |
| *H02B 11/10* | (2006.01) |
| *H02B 11/24* | (2006.01) |
| *H02B 11/167* | (2006.01) |
| *H02B 1/14* | (2006.01) |

(52) U.S. Cl.
CPC ........... *H02B 11/133* (2013.01); *H02B 11/10* (2013.01); *H02B 11/24* (2013.01); *H02B 1/14* (2013.01); *H02B 11/167* (2013.01)

(58) Field of Classification Search
CPC ........ H02B 1/14; H02B 11/133; H02B 11/24; H02B 11/10; H02B 11/167; H02B 11/173

USPC .................. 361/607, 609, 615–617
See application file for complete search history.

(56) References Cited

U.S. PATENT DOCUMENTS

2015/0332883 A1* 11/2015 Benke .................. H01H 71/125
335/9

OTHER PUBLICATIONS

Instructions for the Type VCP-W Ground & Test Device (Simple) Bottom Terminal Set Version Eaton Corporation (Year: 2015).*
Type VR Electrically Operated Ground and Test Device Instruction Bulletin Square D (Year: 2015).*

* cited by examiner

*Primary Examiner* — Zachary Pape
(74) *Attorney, Agent, or Firm* — Eckert Seamans Cherin & Mellott, LLC

(57) ABSTRACT

An interlock system includes a number of lock assemblies and a number of keys. Each key is associated with at least one lock assembly. The number of lock assemblies includes a number of actuator lock assemblies and a number of multi-purpose lock assemblies. The number of keys includes a number of actuator keys and a number of multi-purpose keys. At least one lock assembly is operatively coupled to a reliable indicator.

12 Claims, 4 Drawing Sheets

INTERLOCK SYSTEM FOR AN ELECTRICAL INSTALLATION

BACKGROUND OF THE INVENTION

Field of the Invention

The disclosed and claimed concept relates to an interlock system and, more particularly, to an interlock system for circuit breaker test equipment.

Background Information

Safety systems for circuit breakers and other electrical equipment include, but are not limited to, interlocks and key systems. The following example uses the term "circuit breaker" broadly and includes circuit breakers, switchgears, and test equipment, such as, but not limited to, ground and test devices. An "interlock" or "interlock assembly," as used herein, means a mechanical system structured to place and maintain the circuit breaker, including the internal elements/assemblies, in a specific configuration. For example, in a configuration wherein a circuit breaker is disposed within an enclosure having a door, a mechanical linkage operatively couples the enclosure door to the circuit breaker trip bar. When the enclosure door is opened, the mechanical linkage actuates the trip bar and trips, i.e., opens, the circuit breaker and maintains the trip bar in the tripped position. In this example, the mechanical linkage is an "interlock" because it places and maintains the circuit breaker, including the internal elements/assemblies, in a specific configuration.

Further, as used herein, an "interlock" maintains the circuit breaker, or other electrical equipment, in a specific configuration until the user returns the circuit breaker, or other electrical equipment, to the original configuration or other desired configuration. That is, in the example of the interlock above, the circuit breaker is maintained in the tripped/open configuration so long as the enclosure door is open. If the user were able to close the circuit breaker while the door is open, the assembly is not an "interlock," but is rather an automatic trip assembly.

Further, as used herein, an interlock can be "passive" or "active." As used herein, a "passive" interlock operates when a user performs an action that does not directly engage the interlock. The example above, wherein a door is opened to actuate the interlock, is a "passive" interlock. An "active" interlock, as used herein, means that a user directly actuates the interlock elements. In a simplified example, two adjacent circuit breakers have pivoting switches, similar to a common pivoting light switch, on their front panels. An interlock for this system includes a bar that slides over the path of travel of both circuit breaker switches. The bar has a limited length and is structured to block the path of travel of one of the two circuit breaker switches. That is, the bar must be in the path of one circuit breaker switch, but cannot be in the path of both. The bar is moved between the circuit breakers by a user. This is an example of an "active" interlock. That is, the user directly moves the bar between the two circuit breakers.

As used herein, all "locks" are "lock assemblies." That is, the terms "lock" and "lock assembly" are interchangeable. Further, all "locks" have at least one keyhole with an associated key. Further, as used herein, a lock is "actuated" by a key. That is, as used herein, "actuation" of a lock means that a key is placed in the associated lock key hole and is turned.

Key systems include a number of keys and lock assemblies wherein the keys must be inserted into the lock assemblies in a generally specific order and wherein the lock assemblies actuate a mechanical link to equipment associated with the circuit breaker and/or release a key for subsequent use. Known key systems include "release" lock assemblies (and associated keys), "actuator" lock assemblies (and associated keys), and "dual-purpose" lock assemblies (and associated keys). These are defined as follows.

As used herein, a "release" lock assembly includes a lock assembly with two key holes; a main key hole and a secondary key hole. One key is always captured in a "release" lock assembly. That is, a key is always in at least one of the main key hole or secondary key hole. For example, a user carries a main key while a secondary key is initially captured in the secondary key hole. When a user inserts and turns (or actuates) the main key in the main key hole, the secondary key is released from the secondary key hole and the main key becomes captured in the main key hole. The secondary key can then be removed for use elsewhere. It is understood that to release the main key, the secondary key must be reinserted into the secondary key hole and turned (actuated). Further, the main key is then rotated to its initial position wherein it can be removed from the release lock assembly and the secondary key becomes captured again. In the discussion below, and as used herein, when a "release" lock assembly is initially described as capturing a specific key, it is understood that the captured key is the one that is initially captured in the secondary key hole.

Further, with the exceptions noted below, as used herein, the "release" lock assemblies are identified sequentially as first, second, third, etc. The associated "release" keys are identified by similar name. As used herein, the "first" release key corresponds to, i.e., is structured to be, and is, used in, the main key hole of the "first" release lock assembly. Thus, the "second" release key corresponds, i.e., is structured to be, and is used in, the main key hole of the "second" release lock assembly. One exception to this nomenclature is a "plurality" release key. A "plurality" release key corresponds to, i.e., is structured to be, and is, used in multiple "release" lock assemblies. A "plurality" release key cannot actuate the "release" lock assembly in which it is initially captured.

As used herein, an "actuator" lock assembly includes a single key hole and an actuator that acts upon another element or assembly. The actuator, for example, can actuate a trip unit on a circuit breaker. That is, in one embodiment, the actuator is an "electrical actuator" such as, but not limited to, a switch, that is in electrical communication with an electrical assembly such as, but not limited to, a trip unit. It is understood that an "electrical actuator" includes mechanical elements as well as electrical elements and that, as used herein, an "electrical actuator" means that the actuator actuates an electrical construct. Alternately, in another embodiment, the actuator is a "mechanical" actuator such as, but not limited to a mechanical linkage. That is, as used herein, a "mechanical actuator" means a mechanical construct that is operatively coupled to a mechanical construct. For example, in one embodiment, the "mechanical actuator" is a blocking member, similar to a deadbolt, that moves between an extended position and a retracted position when the "actuator" lock assembly is actuated. As used herein, a "mechanical actuator" is not operatively coupled to a pole shaft in a circuit breaker operating mechanism. Thus, a "mechanical actuator," or an "actuator" lock assembly, is not a pole shaft interlock as the "mechanical actuator"/ blocking member does not configure and maintain the pole shaft of a circuit breaker operating mechanism in a desired configuration.

Similar to the release lock assemblies and keys, the "actuator" lock assemblies are identified sequentially, i.e., first, second, third, etc. The "first" actuator key corresponds to, i.e., is structured to be, and is, used in, the "first" actuator lock assembly. As before, in some embodiments, there are "plurality" actuator keys that actuate multiple actuator lock assemblies.

As used herein, a "dual-purpose" lock assembly combines the functions of a "release" lock assembly and an "actuator" lock assembly, as defined above. A "dual-purpose" lock or "dual-purpose" lock assembly includes two key holes similar to a "release" lock assembly. However, actuation of the main key also actuates an "electrical actuator" or a "mechanical actuator" that is operatively coupled to a construct other than the pole shaft of a circuit breaker operating mechanism. That is, as a user rotates a key in the main key hole, something is actuated (as with an "actuator" lock assembly) and a secondary key is released. For example, in a circuit breaker, a "dual-purpose" lock assembly is electrically operatively coupled to a trip unit and captures a plurality release key. When actuated, the exemplary "dual-purpose" lock assembly electrically actuates the trip unit (thereby opening the contacts of the circuit breaker) and releases the plurality release key. Further, as used herein, a "dual-purpose" lock or "dual-purpose" lock assembly, in an exemplary embodiment, includes an interlock. That is, the exemplary "dual-purpose" lock assembly discussed in this paragraph further includes a mechanical linkage/blocking member that blocks actuation of a "close" button that is structured to initiate the closing of the contacts. As noted above, as used herein, a "dual-purpose" lock or "dual-purpose" lock assembly is operatively coupled to a construct other than the pole shaft of a circuit breaker operating mechanism.

Similar to the release lock assemblies and keys, the "dual-purpose" lock assemblies and keys are identified sequentially, i.e., first, second, third, etc. As used herein, the "first" dual-purpose key corresponds to, i.e., is structured to be, and is, used in, the main key hole of the "first" dual-purpose lock assembly. Thus, the "second" dual-purpose key corresponds, i.e., is structured to be, and is, used in the main key hole of the "second" dual-purpose lock assembly. As before there is, in an exemplary embodiment, a "plurality" dual-purpose key that is structured to, and does, individually actuate different "dual-purpose" lock assemblies.

For example, a simplified key system includes a circuit breaker disposed in an enclosure having a door, a first dual-purpose lock assembly, a first release lock assembly, a first actuator lock assembly, a first dual-purpose key, a first release key, and a first actuation key. The circuit breaker is movably disposed on rails so that it is structured to be moved in and out of the enclosure. In this example, the first dual-purpose lock assembly is electronically linked to a trip device on the circuit breaker and captures the first release key. That is, when the first dual-purpose lock assembly is actuated, the circuit breaker is tripped (opened) and the first release key is released. The first release lock assembly captures the first actuator key. The first actuator lock assembly includes a blocking member that moves between a retracted position and a blocking position extending through a rail. That is, when the blocking member is in the blocking position, the blocking member prevents the circuit breaker from moving over the rails and in/out of the enclosure.

In operation, the circuit breaker contacts are closed and the circuit breaker is disposed within the enclosure with the blocking member of the first actuator lock assembly in the extended position. In this configuration, the circuit breaker cannot be removed from the enclosure because the blocking member of the first actuator lock assembly is in the extended position. To remove the circuit breaker from the enclosure, a user with the first dual-purpose key utilizes the first dual-purpose key thereby tripping (opening) the circuit breaker and releasing the first release key. The user then uses the first release key in the first release lock assembly to release the first actuator key. The user then uses the first actuator key to retract the blocking member of the first actuator lock assembly. The circuit breaker, which is now open, is then removed from the enclosure.

Thus, the key system encourages users to configure the circuit breaker in a desired configuration. Such a system, however, is not mechanically coupled to a reliable indicator of the position of the contact assemblies such as, but not limited to, the circuit breaker operating mechanism pole shaft. This is a problem. That is, in the example above, after utilizing the first dual-purpose key the user could, intentionally or inadvertently, close the contacts on the circuit breaker. If that is done prior to removing the circuit breaker from the enclosure, a dangerous arc may form when the circuit breaker is removed from the enclosure. Thus, there is room for improvement in a key system.

FIG. 1 schematically shows a ground and test device (hereinafter "circuit breaker assembly 10") at an electrical installation 11 with a prior art key system 1. An exemplary embodiment of the electrical installation 11 is the Eaton 38 kV VCPW-HD SEG&TD (Simple Electrically operated Ground & Test Device). The electrical installation 11 includes the circuit breaker assembly 10 as well as an enclosure 40, discussed below. It is noted that the prior art key system 1 includes elements with reference numbers 1-9. It is, however, understood that both the prior art system 1 and the disclosed and claimed interlock system 100, discussed below, interact with elements of the circuit breaker assembly 10. Thus, the circuit breaker assembly 10 is discussed in this section. The claimed interlock system 100, however, is identified as part of the circuit breaker assembly 10. Thus, as used herein, the "circuit breaker assembly 10" is part of the disclosed and claimed concept. Stated alternately, the discussion of the circuit breaker assembly 10 in this section does not indicate that circuit breaker assembly 10 is prior art.

The circuit breaker assembly 10 includes a housing assembly 12 defining an enclosed space 14 (this is enclosed space defined by the circuit breaker housing assembly), a number of separable contact assemblies 16, an operating mechanism 18 including a motor assembly 20 and a pole shaft 21, a conductor assembly 22 including conductive members 24, as well as a number of number of test ports 26 that are structured to, and do, allow access to conductive members 24. The circuit breaker 10 further includes a shutter assembly 30 including shutter members 32. The separable contact assemblies 16 and operating mechanism 18, including the motor assembly 20, are disposed in the circuit breaker housing assembly enclosed space 14. The conductor assembly 22 including conductive members 24 are substantially disposed in the circuit breaker housing enclosed space 13.

As is known, the separable contact assemblies 16 include a movable contact 15 and a stationary or fixed contact 17. Each movable contact 15 moves between an open, first position, wherein the movable contact 15 is spaced from and not in electrical communication with the associated fixed contact 17, and, a closed, second position, wherein the movable contact 15 is not spaced from and is in electrical communication with the associated fixed contact 17. The operating mechanism 18, and more specifically the motor 20, is structured to charge a number of closing springs (not shown) as is known, and to close the separable contact assemblies 16. The operating mechanism 18 is also structured to open the separable contact assemblies 16 via the pole shaft 21. That is, the pole shaft 21 moves between a first and second position corresponding to the position(s) of the movable contacts 15. That is, when the pole shaft 21 is in its first position, the movable contacts 15 are also in their first positions, and, when the pole shaft 21 is in its second position, the movable contacts 15 are also in their second positions. Thus, the pole shaft 21 is a reliable indicator of the position(s) of the movable contacts 15.

The circuit breaker assembly 10 further includes a control system 50 that is structured to, and does, control the operating mechanism 18. Hereinafter, the circuit breaker assembly control system 50 is identified as the "operating mechanism control system 50" and is also identified as part of the operating mechanism 18. The operating mechanism control system 50 includes an electrical control assembly 52 (shown schematically) and a mechanical control assembly 54. As is known, the electrical control assembly 52 is structured to, and does, actuate the operating mechanism 18 remotely and via electronic components (not shown). The mechanical control assembly 54 is structured to, and does, actuate the operating mechanism 18 mechanically. The mechanical control assembly 54 is represented by actuators (or buttons) such an open button 56 and a close button 58. Actuation of the mechanical control assembly open button 56 causes the separable contact assemblies 16 to move from the second position (closed) to the first position (open). Conversely, actuation of the mechanical control assembly close button 58 causes the separable contact assemblies 16 to move from the first position (open) to the second position (closed). As is known, when the electrical control assembly 52 is disabled, the circuit breaker assembly 10 is said to be "electrically disabled." Conversely, when the electrical control assembly 52 is enabled, the circuit breaker assembly 10 is said to be "electrically enabled."

The test ports 26 are covered by the sliding shutter assembly 30 to protect users until access is needed. That is, the shutter members 32 are movably coupled to the circuit breaker housing 12 adjacent to, or at, the test ports 26. Each shutter member 32 includes a body 34 with a number of impassible portions 36 and a number of elongated passages 38. Each shutter member 32 is structured to, and does, move between a first position, wherein each impassible portion 36 is disposed over an associated test port 26, and, a second position, wherein each passage 38 is disposed over an associated test port 26. In an exemplary embodiment, each shutter member 32 is slidably coupled to the circuit breaker housing 12 by lugs 31 which extend from the circuit breaker housing 12. That is, the lugs 31 extend through each shutter member passage 38 thereby coupling each shutter member 32 to the circuit breaker housing 12. When the shutter member 32 is in the first position, the test ports 26 are disposed substantially at a lug 31.

The circuit breaker assembly 10 is structured to be moved in and out of the enclosure 40. The enclosure 40 includes a number of sidewalls 42 defining a generally enclosed space 44 (this enclosed space 44 is the space into which the circuit breaker assembly is inserted during use), a carriage 46 and a number of rails 48. It is understood that line conductors and load conductors (not shown) extend into the enclosure enclosed space 44 and that the circuit breaker conductor assembly 22 is structured to be, and is, selectively coupled to and in electrical communication with the line and load conductors. The carriage 46 is movably disposed on the rails 48. The carriage 46 is structured to, and does, move between an exposed, first position wherein the carriage 46 is disposed substantially outside the enclosure enclosed space 44 (wherein the circuit breaker conductor assembly 22 is not coupled to and in electrical communication with the line and load conductors), and, an enclosed, second position, wherein the carriage 46 is substantially disposed within the enclosure enclosed space 44 (wherein the circuit breaker conductor assembly 22 is coupled to and in electrical communication with the line and load conductors). The circuit breaker housing 12, and thus the circuit breaker assembly 10, is coupled to, and moves with, the carriage 46. Thus, the circuit breaker housing 12 also moves between a first and second position corresponding to the carriage 46 position.

Further, the enclosure 40 includes a number of interlocks (none shown) that are separate and/or independent from the key system 1, discussed below. For example, to assist with moving the carriage 46 and circuit breaker assembly 10 in and out of the enclosure enclosed space 44, the enclosure 40, in an exemplary embodiment, includes a racking system (not shown) that drives the carriage 46. An interlock associated with the carriage is structured to, and does, ensure that the separable contact assemblies 16 are in the open, first position when the carriage 46 moves. Thus, a user cannot utilize the racking system to move the circuit breaker assembly 10 in and out of the enclosure enclosed space 44 when the separable contact assemblies 16 are in the closed, second position. This interlock is, as used herein, the "racking interlock" and is not part of the key system 1.

The circuit breaker assembly 10 is used for grounding the circuit, phase testing and voltage probing during the maintenance of the buses and cables of the electrical installation 11. Care must be taken by the operator in order to avoid any short circuit and arc flash incidences during installation and use of the circuit breaker assembly 10. To accomplish this, a safety protocol utilizing a key system 1, discussed below, has been implemented. The protocol, however, assumes the circuit breaker assembly 10 is configured in specified states at various times during the installation process and use of the test ports 26. If the state of the circuit breaker assembly 10 does not conform to the protocol, the user may be exposed to an arc or other dangerous conditions. One pair of conditions the keyed system 1 should enforce is that the sliding shutter members 32 should be movable (so as to access the ports 26 to the conductors 24) only when (1) the circuit breaker is closed/grounded, and, (2) the circuit breaker cannot be opened while inserting the probes. To effect the protocol, the circuit breaker assembly 10 further includes a key system 1, hereinafter, "the prior art key system 1."

The prior art key system 1 is generally satisfactory but due to unforeseen (or unforeseeable) circumstances such as, but not limited to a failure of the mechanical elements, these conditions are not always met. This is a problem. In FIG. 1, the prior art key system 1 includes a first dual-purpose lock assembly 2 (identified as "control lock assembly #1"), a second dual-purpose lock assembly 3 (identified as "control lock assembly #2"), a third dual-purpose lock assembly 4 (identified as "lock assembly #4"), a first actuator lock assembly 5 (identified as "lock assembly #3"), a second actuator lock assembly 6 (as shown, a set of two second actuator lock assemblies 6, identified as "lock assemblies #5 and 6), a first dual-purpose key 7 (identified as key "KU"), a plurality dual-purpose key 8 (identified as key "KB"), a first actuation key 9' (identified as key "KC"), and a second actuation key 9" (identified as key "KD"). Hereinafter the lock assemblies 2, 3, 4, 5, 6 are collectively identified by reference number 102 and the keys 7, 8, 9', 9" are collectively identified by reference number 104, see below.

The first dual-purpose lock assembly 2 captures the plurality dual-purpose key 8 and is operatively coupled to the electrical control assembly 52. That is, actuation of the first dual-purpose lock assembly 2 switches the status of the electrical control assembly 52. During normal operation, or transport prior to installation, the first dual-purpose key 7 (KU), is not captured in the first dual-purpose lock assembly 2. In this configuration, the electrical control assembly 52 is electrically enabled. When the first dual-purpose key 7 is inserted into the first dual-purpose lock assembly 2 and actuated, the electrical control assembly 52 is electrically disabled. Stated alternately, the first dual-purpose lock assembly 2 is structured to perform a primary circuit breaker function. As used herein, to "perform a primary circuit breaker function" means to switch the electrical control assembly 52 between the enabled and disabled states, as discussed above. It is understood that when the first dual-purpose lock assembly 2 is actuated and the plurality dual-purpose key 8 is released, the electrical control assembly 52 is moved to the disabled state. Further, when the plurality dual-purpose key 8 is again placed in the first dual-purpose lock assembly 2 and the first dual-purpose lock assembly 2 is actuated, thereby capturing the plurality dual-purpose key 8, the electrical control assembly 52 is moved to the enabled state. That is, when the first dual-purpose lock assembly 2 is initially actuated, the plurality dual-purpose key 8 is released and the electrical control assembly 52 is disabled. When the first dual-purpose lock assembly 2 is returned to its initial state (wherein the plurality dual-purpose key 8 is captured and the first dual-purpose key 7 is removed) the electrical control assembly 52, and therefore the circuit breaker assembly 10 is enabled.

The second dual-purpose lock assembly 3 is operatively coupled to the close button 58. The second dual-purpose lock assembly 3 initially captures the first actuation key 9'. In an exemplary embodiment, the second dual-purpose lock assembly 3 includes a blocking member 3B structured to block the actuation of the mechanical control assembly close button 58. That is, when the second dual-purpose lock assembly 3 is actuated, the second dual-purpose lock assembly blocking member 3B mechanically blocks the actuation of the mechanical control assembly close button 58. That is, the separable contact assemblies 16 are, as used herein, "mechanically locked open." Stated alternately, the second dual-purpose lock assembly blocking member 3B moves into the path of the mechanical control assembly close button 58. Actuation of the second dual-purpose lock assembly 3 releases the first actuation key 9'. Further, the actuation of the second dual-purpose lock assembly 3 moves the second dual-purpose lock assembly blocking member 3B into the path of the mechanical control assembly close button 58. A subsequent actuation of the second dual-purpose lock assembly 3 captures the first actuation key 9' and moves the second dual-purpose lock assembly blocking member 3B out of the path of the mechanical control assembly close button 58, but does not actuate the mechanical control assembly close button 58.

The first actuator lock assembly 5 includes a blocking member 5B. The first actuator lock assembly 5 is structured to, and does, move between a first configuration, wherein the first actuator lock assembly blocking member 5B is structured to block the carriage 46 from moving over the rails 48, and, a second configuration, wherein the first actuator lock assembly blocking member 5B is not structured to block the carriage 46 from moving over the rails 48. In an exemplary embodiment, the rails 48 include an opening in their upper surface (not shown). The first actuator lock assembly blocking member 5B is structured to extend through the opening in the rail upper surface when in the first configuration and to be withdrawn through the opening in their rail upper surface when in the second configuration. It is further noted that the racking interlock, discussed above, is associated with the carriage 46 and/or racking system (not shown). Thus, prior to moving the carriage 46/circuit breaker assembly 10, the separable contact assemblies 16 are in the open, first position, as discussed above.

The third dual-purpose lock assembly 4 is operatively coupled to both the mechanical control assembly open button 56 and the close button 58 (or a similar construct structured to close the separable contact assemblies 16). The third dual-purpose lock assembly 4 initially captures the second actuation key 9". In an exemplary embodiment, the first actuator lock assembly 5 includes a blocking member 5B structured to block the actuation of the mechanical control assembly open button 56. That is, when the third dual-purpose lock assembly 4 is actuated, the third dual-purpose lock assembly blocking member 4B mechanically blocks the actuation of the mechanical control assembly open button 56. Stated alternately, the third dual-purpose lock assembly blocking member 4B moves into the path of the mechanical control assembly open button 56. Initial actuation of the third dual-purpose lock assembly 4 actuates the close button 58 (or a similar construct structured to close the separable contact assemblies 16) and causes the separable contact assemblies 16 to close. Further, the actuation of the third dual-purpose lock assembly 4 releases the second actuation key 9". Further, the actuation of the third dual-purpose lock assembly 4 moves the third dual-purpose lock assembly blocking member 4B into the path of the mechanical control assembly open button 56. A subsequent actuation of the third dual-purpose lock assembly 4 captures the second actuation key 9" and moves the third dual-purpose lock assembly blocking member 4B out of the path of the mechanical control assembly open button 56, but does not actuate the mechanical control assembly open button 56.

In an exemplary embodiment, each shutter member 32 includes two spaced notches; a first notch 33 and a second notch 35, or, two openings (not shown). Further, each second actuator lock assembly 6 includes a blocking member 6B. Each second actuator lock assembly 6 is structured to, and does, move between a first configuration, wherein the second actuator lock assembly blocking member 6B is structured to block said shutter member 32 from moving between the first and second position, and, a second configuration, wherein the second actuator lock assembly blocking member 6B is structured to not block the shutter member 32 from moving between the first and second position. In an exemplary embodiment, the second actuator lock assembly blocking member 6B is structured to, and does, move in and out of the shutter member first notch 33 and the shutter member second notch 35. That is, when the shutter member 32 is in the first position and the second actuator lock assembly 6 is in the first configuration, the second actuator lock assembly blocking member 6B is disposed in the shutter member first notch 33 and prevents movement of the shutter member 32. When the second actuator lock assembly 6 is actuated, the second actuator lock assembly blocking member 6B moves out of the shutter member first notch 33 and the shutter member 32 is free to be moved to the second position. When the shutter member 32 is in the second position, actuation of the second actuator lock assembly 6 moves the second actuator lock assembly blocking member 6B into the shutter member second notch 35 and the shutter member 32 is locked in the second position. Stated alternately, and in an exemplary embodiment, when the shutter member 32 is in the second position, each second actuator lock assembly 6 is structured to be, and is, actuated so as to extend the second actuator lock assembly blocking member 6B into the shutter member second notch 33, thereby temporarily locking the shutter member 32 in the second position. The shutter member 32 is returned to the first position by reversing the procedure described in this paragraph.

The table below identifies the various lock assemblies, keys, the initial location of the keys and the expected status of the circuit breaker assembly 10 as the keys are utilized.

f. Utilizing the plurality dual-purpose key 8 in the third dual-purpose lock assembly 4 thereby closing the separable contact assemblies 16, moving the third dual-purpose lock assembly blocking member 4B into the path of the mechanical control assembly open button 56, and releasing the second actuation key 9". It is noted that the separable contact assemblies 16 are closed before the shutter member 32 can be moved.

g. Utilizing the second actuation key 9" in the second actuator lock assembly 6 thereby releasing the shutter member 32 to be moved into the second position.

At this point, testing probes (not shown) can be inserted through the shutter member 32 and the test ports 26 and into contact with the circuit breaker assembly conductive members 24.

Thus, the prior art key system 1 causes the circuit breaker assembly 10 to be in desired states at various points of the

| KIRK LOCK # | KEYS | | | | STATUS |
| --- | --- | --- | --- | --- | --- |
| | KU | KB | KC | KD | |
| | UTILITY LOCK BOX | ON G&TD (KK#1) | ON G&TD (KK#2) | ON G&TD (KK#4) | INACTIVE/NON-OPERATIONAL |
| #1 | RELEASED | CAPTURED | — | — | ELECTRICALLY ENABLED |
| #1 | CAPTURED | RELEASED | — | — | ELECTRICALLY ENABLED |
| #2 | — | RELEASED | CAPTURED | — | OPEN AND UNLOCKED, CAN CLOSE |
| #2 | — | CAPTURED | RELEASED | — | OPEN AND LOCKED, CAN NOT CLOSE |
| #3 | — | — | RELEASED | — | SLIDE HANDLE LOCKED, CRADLE LOCKED |
| #3 | — | — | CAPTURED | — | SLIDE HANDLE UNLOCKED, (CRADLE UNLOCKED) |
| #4 | — | RELEASED | — | CAPTURED | CLOSE AND UNLOCKED, CAN OPEN |
| #4 | — | CAPTURED | — | RELEASED | CLOSE AND LOCKED, CAN NOT OPEN |
| #5 | — | — | — | CAPTURED | PORT SHUTTER UNLOCKED |

Thus, the procedure for moving the circuit breaker assembly 10 into a testing position and opening a shutter member 32 includes the following actions:

a. Utilizing first dual-purpose key 7 in first dual-purpose lock assembly 2 thereby placing the circuit breaker assembly 10 in the electrically disabled state and releasing the plurality dual-purpose key 8.

b. Utilizing the plurality dual-purpose key 8 in the second dual-purpose lock assembly 3 thereby opening the separable contact assemblies 16, moving the second dual-purpose lock assembly blocking member 3B moves into the path of the mechanical control assembly close button 58, and releasing the first actuation key 9'. It is noted that the separable contact assemblies 16 are open and cannot be closed by pressing the mechanical control assembly close button 58.

c. Utilizing the first actuation key 9' in first actuator lock assembly 5 thereby moving the first actuator lock assembly blocking member 5B out of the path of the carriage 46.

d. Moving the carriage 46, and therefore the circuit breaker assembly 10, into the enclosure 40; this places the circuit breaker assembly conductive members 24 in electrical communication with the enclosure line conductor and enclosure load conductor.

e. Returning the first actuation key 9' to the second dual-purpose lock assembly 3 and retuning the second dual-purpose lock assembly 3 to its initial state; i.e., releasing the plurality dual-purpose key 8 and moving the second dual-purpose lock assembly blocking member 3B out of the path of the mechanical control assembly close button 58. It is noted that the separable contact assemblies 16 are still open at this point in the procedure.

procedure. This, however, is contingent upon selected elements operating as intended. If certain elements are not operating properly, the circuit breaker assembly 10 may not be in the desired state at a particular point of the procedure. For example, if the second dual-purpose lock assembly 3 fails to open the separable contact assemblies 16 when actuated, and if the user does not notice this failure, the separable contact assemblies 16 will be in the closed, second position when the circuit breaker is moved into the enclosure 40. This could cause a dangerous arc to form. This is a problem.

There is, therefore, a need for an interlock system that includes a lock assembly operatively coupled to a reliable indicator of the position of the separable contact assemblies. There is a further need for such an interlock system to operate with existing key systems. There is a further need for such an interlock system including a number of interlock lock assemblies.

SUMMARY OF THE INVENTION

These needs, and others, are met by at least one embodiment of the disclosed and claimed concept which provides an interlock system including a number of lock assemblies and a number of keys. Each key is associated with at least one lock assembly. The number of lock assemblies includes a number of actuator lock assemblies and a number of multi-purpose lock assemblies. The number of keys includes a number of actuator keys and a number of multi-purpose keys. At least one lock assembly is operatively coupled to a reliable indicator.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
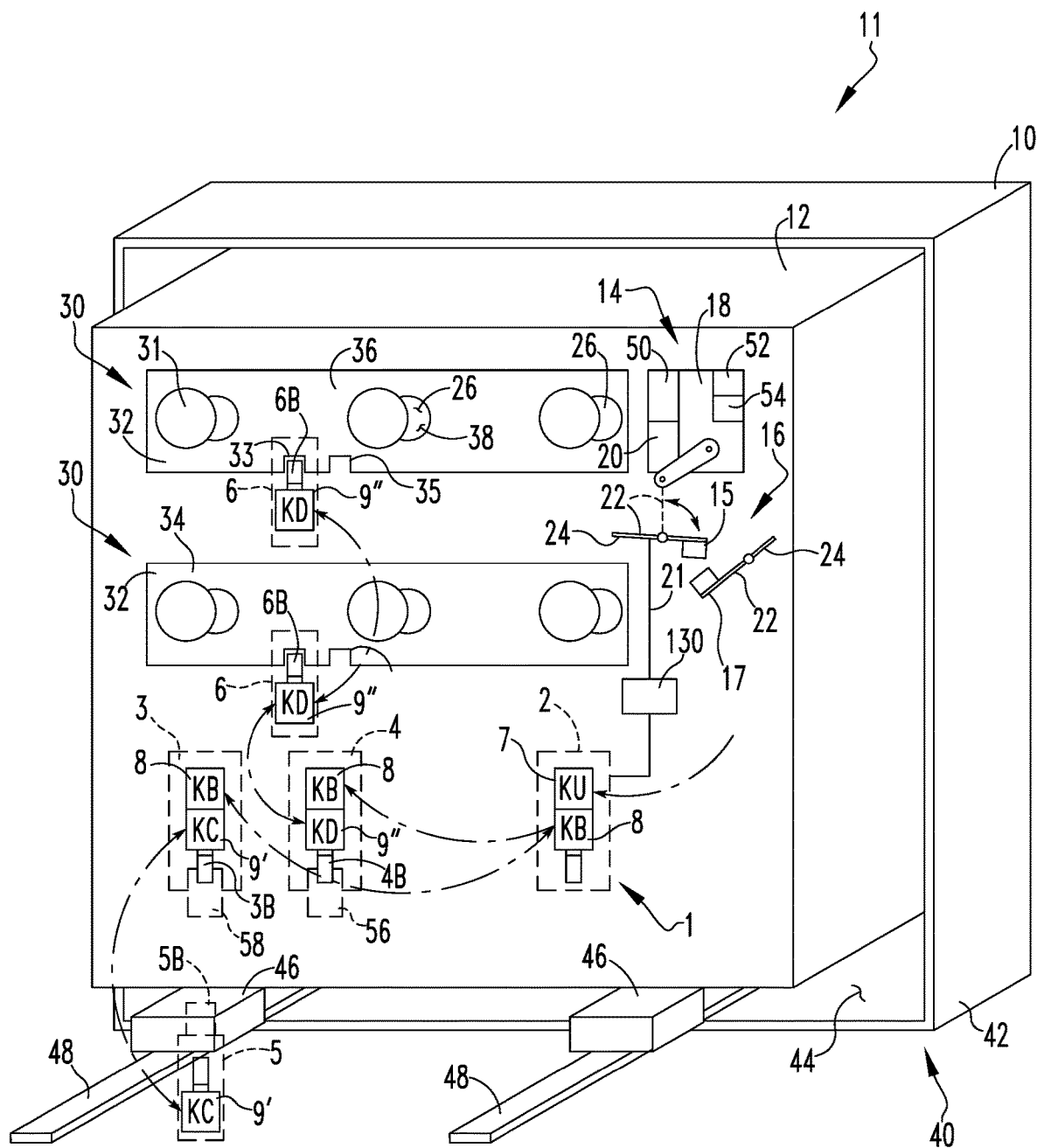
FIG. 1 is a schematic view of a prior art keyed system.

It will be appreciated that the specific elements illustrated in the figures herein and described in the following specification are simply exemplary embodiments of the disclosed concept, which are provided as non-limiting examples solely for the purpose of illustration. Therefore, specific dimensions, orientations, assembly, number of components used, embodiment configurations and other physical characteristics related to the embodiments disclosed herein are not to be considered limiting on the scope of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

As used herein, "structured to [verb]" means that the identified element or assembly has a structure that is shaped, sized, disposed, coupled and/or configured to perform the identified verb. For example, a member that is "structured to move" is movably coupled to another element and includes elements that cause the member to move or the member is otherwise configured to move in response to other elements or assemblies. As such, as used herein, "structured to [verb]" recites structure and not function. Further, as used herein, "structured to [verb]" means that the identified element or assembly is intended to, and is designed to, perform the identified verb. Thus, an element that is merely capable of performing the identified verb but which is not intended to, and is not designed to, perform the identified verb is not "structured to [verb]."

As used herein, "associated" means that the elements are part of the same assembly and/or operate together, or, act upon/with each other in some manner. For example, an automobile has four tires and four hubcaps. While all the elements are coupled as part of the automobile, it is understood that each hubcap is "associated" with a specific tire.

As used herein, a "coupling assembly" includes two or more couplings or coupling components. The components of a coupling or coupling assembly are generally not part of the same element or other component. As such, the components of a "coupling assembly" may not be described at the same time in the following description.

As used herein, a "coupling" or "coupling component(s)" is one or more component(s) of a coupling assembly. That is, a coupling assembly includes at least two components that are structured to be coupled together. It is understood that the components of a coupling assembly are compatible with each other. For example, in a coupling assembly, if one coupling component is a snap socket, the other coupling component is a snap plug, or, if one coupling component is a bolt, then the other coupling component is a nut or threaded bore.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. Accordingly, when two elements are coupled, all portions of those elements are coupled. A description, however, of a specific portion of a first element being coupled to a second element, e.g., an axle first end being coupled to a first wheel, means that the specific portion of the first element is disposed closer to the second element than the other portions thereof. Further, an object resting on another object held in place only by gravity is not "coupled" to the lower object unless the upper object is otherwise maintained substantially in place. That is, for example, a book on a table is not coupled thereto, but a book glued to a table is coupled thereto.

As used herein, the phrase "removably coupled" or "temporarily coupled" means that one component is coupled with another component in an essentially temporary manner. That is, the two components are coupled in such a way that the joining or separation of the components is easy and would not damage the components. For example, two components secured to each other with a limited number of readily accessible fasteners, i.e., fasteners that are not difficult to access, are "removably coupled" whereas two components that are welded together or joined by difficult to access fasteners are not "removably coupled." A "difficult to access fastener" is one that requires the removal of one or more other components prior to accessing the fastener wherein the "other component" is not an access device such as, but not limited to, a door.

As used herein, "temporarily disposed" means that a first element(s) or assembly (ies) is resting on a second element(s) or assembly(ies) in a manner that allows the first element/assembly to be moved without having to decouple or otherwise manipulate the first element. For example, a book simply resting on a table, i.e., the book is not glued or fastened to the table, is "temporarily disposed" on the table.

As used herein, "operatively coupled" means that a number of elements or assemblies, each of which is movable between a first position and a second position, or a first configuration and a second configuration, are coupled so that as the first element moves from one position/configuration to the other, the second element moves between positions/configurations as well. It is noted that a first element may be "operatively coupled" to another without the opposite being true.

As used herein, a "fastener" is a separate component structured to couple two or more elements. Thus, for example, a bolt is a "fastener" but a tongue-and-groove coupling is not a "fastener." That is, the tongue-and-groove elements are part of the elements being coupled and are not a separate component.

As used herein, "correspond" indicates that two structural components are sized and shaped to be similar to each other and may be coupled with a minimum amount of friction. Thus, an opening which "corresponds" to a member is sized slightly larger than the member so that the member may pass through the opening with a minimum amount of friction. This definition is modified if the two components are to fit "snugly" together. In that situation, the difference between the size of the components is even smaller whereby the amount of friction increases. If the element defining the opening and/or the component inserted into the opening are made from a deformable or compressible material, the opening may even be slightly smaller than the component being inserted into the opening. With regard to surfaces, shapes, and lines, two, or more, "corresponding" surfaces, shapes, or lines have generally the same size, shape, and contours. With regard to elements/assemblies that are movable or configurable, "corresponding" means that when elements/assemblies are related and that as one element/assembly is moved/reconfigured, then the other element/assembly is also moved/reconfigured in a predetermined manner. For example, a lever including a central fulcrum and elongated board, i.e., a "see-saw" or "teeter-totter," the board has a first end and a second end. When the board first end is in a raised position, the board second end is in a lowered position. When the board first end is moved to a lowered position, the board second end moves to a "corresponding" raised position. Alternately, a cam shaft in an engine has a first lobe operatively coupled to a first piston. When the first lobe moves to its upward position, the first piston moves to a "corresponding" upper position, and, when the first lobe moves to a lower position, the first piston, moves to a "corresponding" lower position.

As used herein, a "path of travel" or "path," when used in association with an element that moves, includes the space an element moves through when in motion. As such, any element that moves inherently has a "path of travel" or "path." Further, a "path of travel" or "path" relates to a motion of one identifiable construct as a whole relative to another object. For example, assuming a perfectly smooth road, a rotating wheel (an identifiable construct) on an automobile generally does not move relative to the body (another object) of the automobile. That is, the wheel, as a whole, does not change its position relative to, for example, the adjacent fender. Thus, a rotating wheel does not have a "path of travel" or "path" relative to the body of the automobile. Conversely, the air inlet valve on that wheel (an identifiable construct) does have a "path of travel" or "path" relative to the body of the automobile. That is, while the wheel rotates and is in motion, the air inlet valve, as a whole, moves relative to the body of the automobile.

As used herein, the statement that two or more parts or components "engage" one another means that the elements exert a force or bias against one another either directly or through one or more intermediate elements or components. Further, as used herein with regard to moving parts, a moving part may "engage" another element during the motion from one position to another and/or may "engage" another element once in the described position. Thus, it is understood that the statements, "when element A moves to element A first position, element A engages element B," and "when element A is in element A first position, element A engages element B" are equivalent statements and mean that element A either engages element B while moving to element A first position and/or element A engages element B while in element A first position.

As used herein, "operatively engage" means "engage and move." That is, "operatively engage" when used in relation to a first component that is structured to move a movable or rotatable second component means that the first component applies a force sufficient to cause the second component to move. For example, a screwdriver may be placed into contact with a screw. When no force is applied to the screwdriver, the screwdriver is merely "temporarily coupled" to the screw. If an axial force is applied to the screwdriver, the screwdriver is pressed against the screw and "engages" the screw. However, when a rotational force is applied to the screwdriver, the screwdriver "operatively engages" the screw and causes the screw to rotate. Further, with electronic components, "operatively engage" means that one component controls another component by a control signal or current.

As used herein, the word "unitary" means a component that is created as a single piece or unit. That is, a component that includes pieces that are created separately and then coupled together as a unit is not a "unitary" component or body.

As used herein, the term "number" shall mean one or an integer greater than one (i.e., a plurality). That is, for example, the phrase "a number of elements" means one element or a plurality of elements. It is specifically noted that the term "a 'number' of [X]" includes a single [X].

As used herein, in the phrase "[x] moves between its first position and second position," or, "[y] is structured to move [x] between its first position and second position," "[x]" is the name of an element or assembly. Further, when [x] is an element or assembly that moves between a number of positions, the pronoun "its" means "[x]," i.e., the named element or assembly that precedes the pronoun "its."

As used herein, "in electronic communication" is used in reference to communicating a signal via an electromagnetic wave or signal. "In electronic communication" includes both hardline and wireless forms of communication; thus, for example, a "data transfer" or "communication method" via a component "in electronic communication" with another component means that data is transferred from one computer to another computer (or from one processing assembly to another processing assembly) by physical connections such as USB, Ethernet connections or remotely such as NFC, blue tooth, etc. and should not be limited to any specific device.

As used herein, "in electric communication" means that a current passes, or can pass, between the identified elements. Being "in electric communication" is further dependent upon an element's position or configuration. For example, in a circuit breaker, a movable contact is "in electric communication" with the fixed contact when the contacts are in a closed position. The same movable contact is not "in electric communication" with the fixed contact when the contacts are in the open position.

As used herein, a "radial side/surface" for a circular or cylindrical body is a side/surface that extends about, or encircles, the center thereof or a height line passing through the center thereof. As used herein, an "axial side/surface" for a circular or cylindrical body is a side that extends in a plane extending generally perpendicular to a height line passing through the center. That is, generally, for a cylindrical soup can, the "radial side/surface" is the generally circular sidewall and the "axial side(s)/surface(s)" are the top and bottom of the soup can. Further, as used herein, "radially extending" means extending in a radial direction or along a radial line. That is, for example, a "radially extending" line extends from the center of the circle or cylinder toward the radial side/surface. Further, as used herein, "axially extending" means extending in the axial direction or along an axial line. That is, for example, an "axially extending" line extends from the bottom of a cylinder toward the top of the cylinder and substantially parallel to, or along, a central longitudinal axis of the cylinder.

As used herein, "generally curvilinear" includes elements having multiple curved portions, combinations of curved portions and planar portions, and a plurality of linear/planar portions or segments disposed at angles relative to each other thereby forming a curve.

As used herein, an "elongated" element inherently includes a longitudinal axis and/or longitudinal line extending in the direction of the elongation.

As used herein, "about" in a phrase such as "disposed about [an element, point or axis]" or "extend about [an element, point or axis]" or "[X] degrees about an [an element, point or axis]," means encircle, extend around, or measured around. When used in reference to a measurement or in a similar manner, "about" means "approximately," i.e., in an approximate range relevant to the measurement as would be understood by one of ordinary skill in the art.

As used herein, "generally" means "in a general manner" relevant to the term being modified as would be understood by one of ordinary skill in the art.

As used herein, "substantially" means "for the most part" relevant to the term being modified as would be understood by one of ordinary skill in the art.

As used herein, "at" means on and/or near relevant to the term being modified as would be understood by one of ordinary skill in the art.

Figure 2:
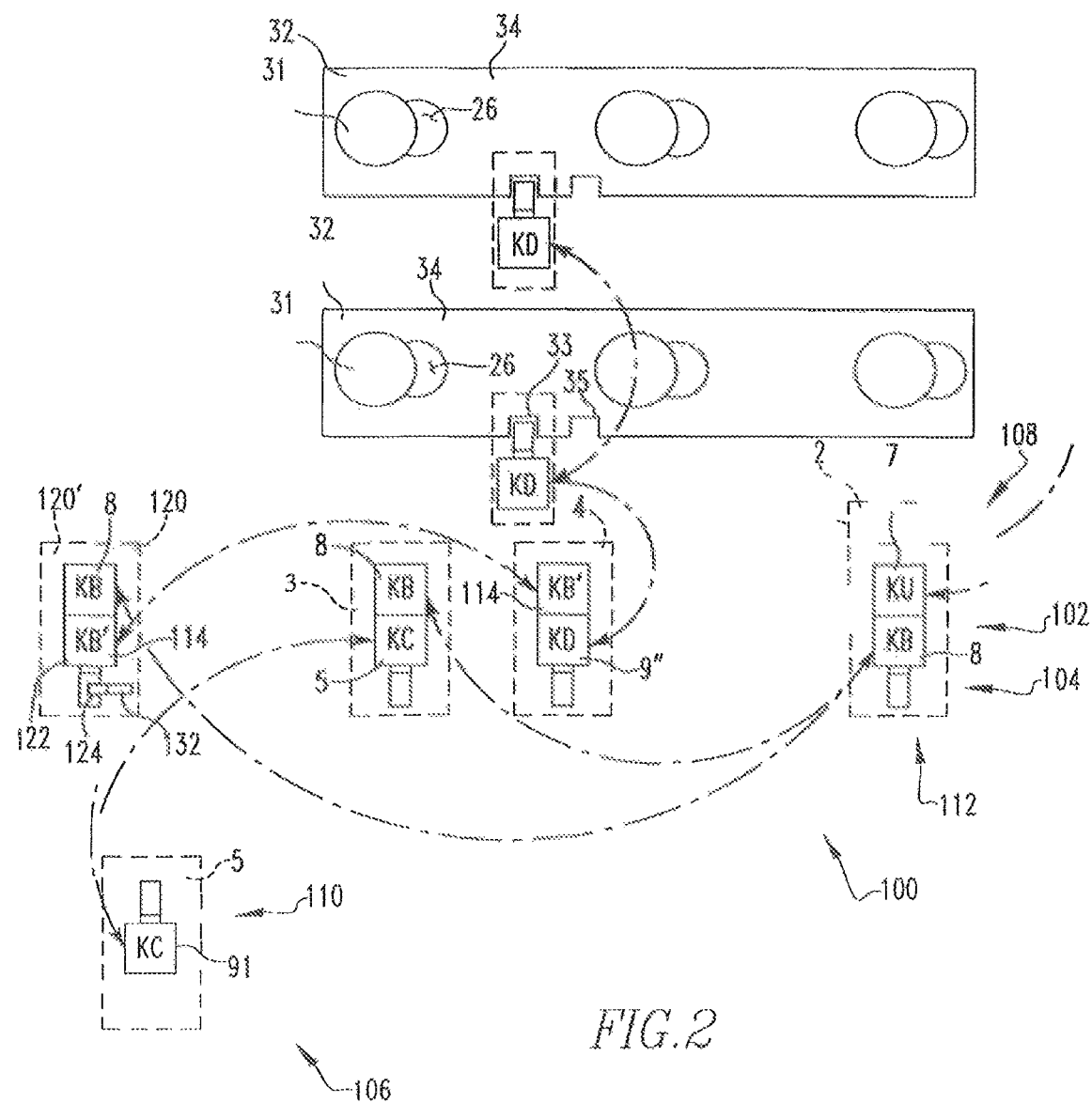
FIG. 2 is a schematic view of one embodiment of an interlock system.

FIG. 2 shows an interlock system 100 for the ground and test device (hereinafter "circuit breaker assembly 10") at an electrical installation 11. The circuit breaker assembly 10 and the electrical installation 11 are substantially similar to the circuit breaker assembly 10 and the electrical installation 11 described above and that description is incorporated by reference. With the exceptions noted below, the interlock system 100 generally utilizes elements of the prior art key system 1 discussed above and the description of those elements is also incorporated herein.

That is, the interlock system 100 includes a number of lock assemblies 102, a number of keys 104 wherein each key 104 is associated with at least one lock assembly 102. The number of lock assemblies 102 includes a number of actuator lock assemblies 106 and a number of multi-purpose lock assemblies 108. The number of keys 104 include a number of actuator keys 110 and a number of multi-purpose keys 112.

As used herein, a "multi-purpose" lock assembly means a "dual-purpose" lock assembly that, in an exemplary embodiment (i.e., optionally), includes more functions than just the functions of a "release" lock assembly and an "actuator" lock assembly. For example, a "multi-purpose" lock assembly, in an exemplary embodiment, includes a lock assembly operatively coupled to a "reliable indicator, or, an "interlock assembly" lock assembly, as defined below. Thus, with the exceptions noted below, the interlock system 100 includes "multi-purpose" lock assemblies 108 that utilize the same reference numbers as the first dual-purpose lock assembly 2, a second dual-purpose lock assembly 3, or a third dual-purpose lock assembly 4 as discussed above. That is, when the same reference numbers are used, it is an indication that the multi-purpose lock assemblies 108 are substantially similar to the dual-purpose lock assemblies 2, 3, 4 discussed above, but are still identified hereinafter as "multi-purpose" lock assemblies 2, 3, 4. Stated alternately, and as used herein, the term "dual-purpose" lock assemblies 2, 3, 4 and "multi-purpose" lock assemblies 2, 3, 4 are each acceptable identifiers for the lock assemblies 2, 3, 4. Similarly, the term "dual-purpose" key 7, 8 is replaceable with the term "multi-purpose" key 7, 8.

In the interlock system 100, at least one of the number of lock assemblies 102 is operatively coupled to a "reliable indicator." As used herein, a "reliable indicator" is an element of a ground and test device and/or circuit breaker assembly that reliably indicates the position, i.e., open or closed, of the separable contact assemblies 16. For example, a pole shaft 21 is a "reliable indicator" in that the pole shaft 21 controls the position of the separable contact assemblies 16. Thus, as used herein, a "reliable indicator" means a physical element that is mechanically operatively coupled (as opposed to being electrically operatively coupled) to the separable contact assemblies 16 and moves therewith, i.e., a "reliable indicator" is always in a position corresponding to the position of the separable contact assemblies 16. Stated alternately, in an exemplary embodiment, a pole shaft 21 is directly coupled to the separable contact assemblies 16 and cannot be in a position other than a position that corresponds to the position of the separable contact assemblies 16, as described above. Thus, a pole shaft 21 that is directly coupled to the separable contact assemblies 16 is a "reliable indicator," as used herein.

Further, a construct that is not, or can possibly not be, in a position corresponding to the position of the separable contact assemblies 16 is not a "reliable indicator." For example, a construct such as a contacts open/closed indicator light, i.e., a construct that is controlled by sensors, cannot be a "reliable indicator" in that lights are not "physically" operatively coupled but are rather operatively coupled to the separable contact assemblies 16 via electronics. Further, as used herein, a lock assembly 102 that is operatively coupled to a "reliable indicator" cannot be actuated when the "reliable indicator" is in a selected position or configuration.

In an exemplary embodiment, the interlock system 100 includes a number of interlock lock assemblies 120 (one shown) and a number of interlock keys 122 (one shown). As used herein, an "interlock lock assembly" means a lock assembly wherein insertion or actuation of a key is selectably prevented depending upon the position of a "reliable indicator." In a "pole shaft interlock assembly," the "reliable indicator" is the pole shaft 21. Further in this embodiment, the interlock lock assembly 120 is a multi-purpose lock assembly, as described below. Thus, the number of number of lock assemblies 102, and more specifically in this embodiment the multi-purpose lock assemblies 108, includes the interlock lock assembly 120. Similarly, the number of keys 104, and more specifically in this embodiment number of multi-purpose keys 112, includes the interlock key 122. In the exemplary embodiment shown, the interlock lock assembly 120 is one of a passive interlock lock assembly or an active interlock lock assembly.

In an exemplary embodiment, the number of interlock lock assemblies 120 includes a pole shaft interlock lock assembly 120'. That is, the interlock lock assembly 120 is operatively coupled to the pole shaft 21 and the interlock is locked, i.e., the interlock key 122 cannot be inserted into the interlock lock assembly 120, or, cannot actuate the interlock lock assembly 120 when the pole shaft 21 is in a selected position. As discussed below, in this embodiment, the interlock lock assembly 120 is locked when the pole shaft 21 is in the first position, i.e., when the separable contact assemblies 16 are in the open position. It is understood that the pole shaft interlock lock assembly 120' includes a linkage 130, shown schematically, that operatively couples the pole shaft 21. The nature of the pole shaft interlock lock assembly linkage 130 varies depending upon the configuration of the circuit breaker assembly 10. In an exemplary embodiment, shown schematically, the pole shaft interlock lock assembly linkage 130 includes rigid links, tension members (such as, but not limited to cables or chains), gears and/or rotational couplings (none numbered). The pole shaft interlock lock assembly linkage 130 further includes an indicator 132.

The pole shaft interlock lock assembly linkage indicator 132 is a construct that indicates the position of the pole shaft 21 and is hereinafter identified as the "operating mechanism pole shaft indicator" 132. In an exemplary embodiment, the operating mechanism pole shaft indicator 132 is a rigid member that is structured to, and does, selectively extend through an opening in the interlock key 122. That is, the interlock key 122 includes an opening or notch 124. In this embodiment, when the pole shaft 21 is in the first position, i.e., when the separable contact assemblies 16 are in the open position, the operating mechanism pole shaft indicator 132 extends through the interlock key 122 and the interlock key 122 cannot be actuated or removed. In this exemplary embodiment, the pole shaft interlock lock assembly 120' is structured to be, and is, coupled to the circuit breaker housing assembly 12. Further, the pole shaft interlock lock assembly is a passive interlock lock assembly that is structured to, and does, capture a single use multi-purpose key 114. As used herein, a "single use multi-purpose key" 114 is a key that is structured to, and does, actuate a single multi-purpose lock assembly 108. In the embodiment discussed immediately below, the single use multi-purpose key 114 is structured to, and does, actuate the third multi-purpose lock assembly 4 and is therefore also identified, with regard to this embodiment, as "the third multi-purpose" key 114.

In this exemplary embodiment, the interlock lock assembly 120 is an additional lock assembly 102 relative to the prior art key system 1. That is, the interlock lock assembly 120 is in addition to the five lock assemblies 2, 3, 4, 5, 6, discussed above. In this embodiment, the interlock system 100 operates in a manner substantially similar to the prior art key system 1 with the following exceptions. In this embodiment, the plurality dual-purpose key 8 is identified as a "plurality multi-purpose key 8." The plurality multi-purpose key 8 is structured to, and does, actuate the second multi-purpose lock assembly 3 and the interlock lock assembly 120, i.e., the pole shaft interlock lock assembly 120'. Unlike the prior art prior art key system 1, the plurality multi-purpose key 8 is not structured to, and does not, actuate the third multi-purpose lock assembly 4. Instead, the third multi-purpose key 114 is structured to, and does, actuate the third multi-purpose lock assembly 4.

Thus, in this embodiment, the interlock system 100 operates as follows, i.e., the procedure for moving the circuit breaker assembly 10 into a testing position and opening a shutter member 32 includes the following actions:

h. Utilizing first multi-purpose key 7 in first multi-purpose lock assembly 2 thereby placing the circuit breaker assembly 10 in the electrically disabled state and releasing the plurality multi-purpose key 8.

i. Utilizing the plurality multi-purpose key 8 in the second multi-purpose lock assembly 3 thereby opening the separable contact assemblies 16, moving the second multi-purpose lock assembly blocking member 3B into the path of the mechanical control assembly close button 58, and releasing the first actuation key 9'. It is noted that the separable contact assemblies 16 are open and cannot be closed by pressing the mechanical control assembly close button 58. Further, the operating mechanism pole shaft indicator 132 is moved into and extends through an opening in the interlock key 122. That is, the interlock key 122 is locked into the pole shaft interlock lock assembly 120'.

j. Utilizing the first actuation key 9' in first actuator lock assembly 5 thereby moving the first actuator lock assembly blocking member 5B out of the path of the carriage 46.

k. Moving the carriage 46, and therefore the circuit breaker assembly 10, into the enclosure 40. This places the circuit breaker assembly conductive members 24 in electrical communication with the enclosure line conductor and enclosure load conductor.

l. Returning the first actuation key 9' to the second multi-purpose lock assembly 3 and retuning the second multi-purpose lock assembly 3 to its initial state; i.e., releasing the plurality multi-purpose key 8 and moving the second dual-purpose lock assembly blocking member 3B out of the path of the mechanical control assembly close button 58. It is noted that the separable contact assemblies 16 are still open at this point in the procedure.

m. Actuating the mechanical control assembly close button 58. This closes the separable contact assemblies 16 and decouples the operating mechanism pole shaft indicator 132 and the interlock key 122. That is, the interlock key 122 is not locked into the interlock lock assembly 120, i.e., the pole shaft interlock lock assembly 120'.

n. Utilizing the plurality dual-purpose key 8 in the interlock lock assembly 120, i.e., the pole shaft interlock lock assembly 120', thereby releasing the third multi-purpose key 114, i.e., the single use multi-purpose key 114.

o. Utilizing the third multi-purpose key 114, i.e., the single use multi-purpose key 114, in the third multi-purpose lock assembly 4 thereby moving the third dual-purpose lock assembly blocking member 4B into the path of the mechanical control assembly open button 56, and releasing the second actuation key 9". It is noted that the separable contact assemblies 16 are closed before the shutter member 32 can be moved. This is ensured by a reliable indicator because the single use multi-purpose key 114 used to actuate the third multi-purpose lock assembly 4 cannot be released unless the pole shaft 21, i.e., the reliable indicator, is in the closed position.

p. Utilizing the second actuation key 9" in the second actuator lock assembly 6 thereby releasing the shutter member 32 to be moved into the second position.

At this point, testing probes (not shown) can be inserted through the shutter member 32 and the test ports 26 and into contact with the circuit breaker assembly conductive members 24. Because the single use multi-purpose key 114 used to actuate the third multi-purpose lock assembly 4 cannot be released unless the pole shaft 21, i.e., the reliable indicator, is in the closed position, the interlock system 100 ensures that the separable contact assemblies 16 before the sliding shutter members 32 are movable. This solves the problem(s) stated above.

Figure 3:
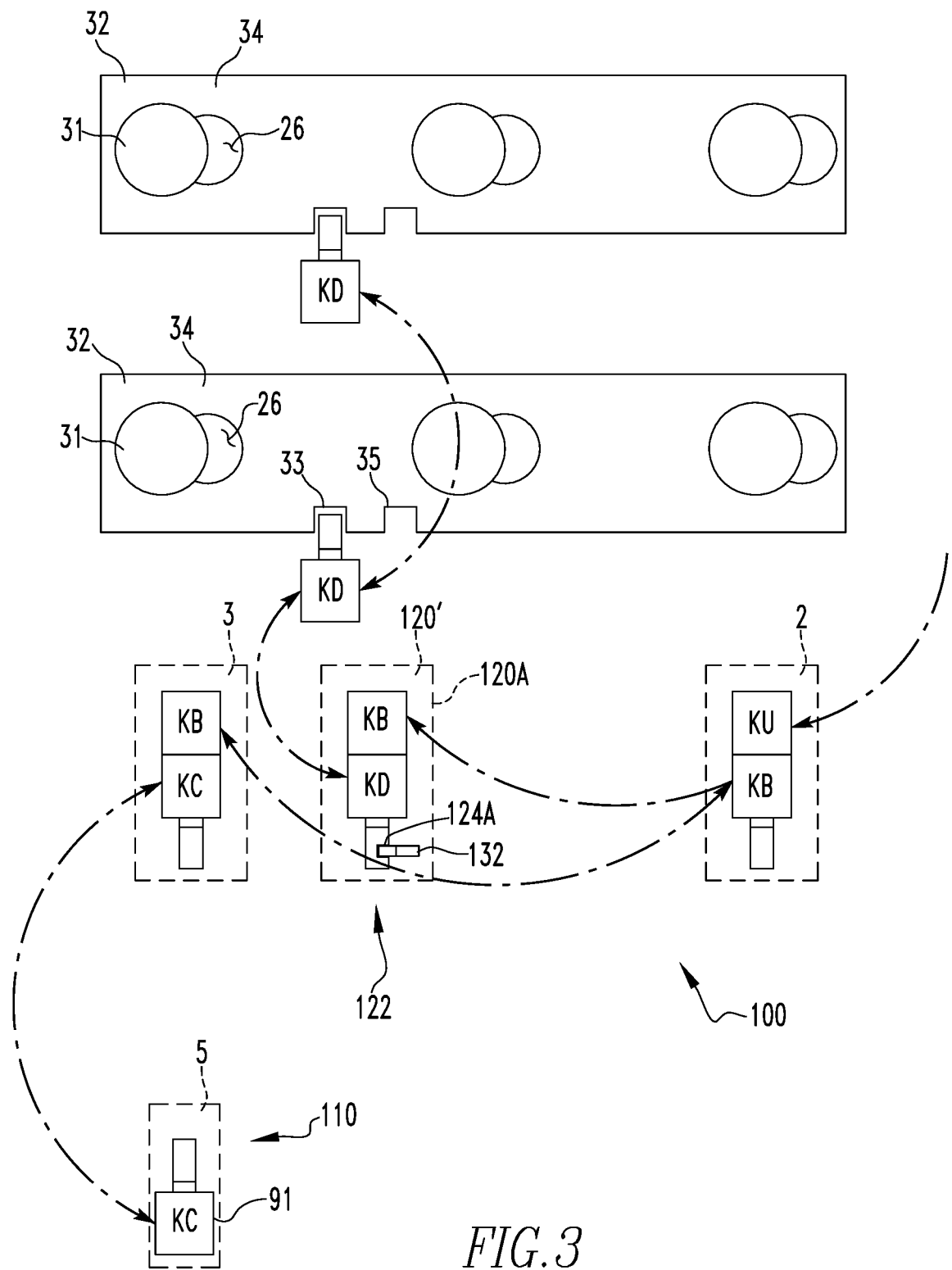
FIG. 3 is a schematic view of another embodiment of an interlock system.
Figure 4:
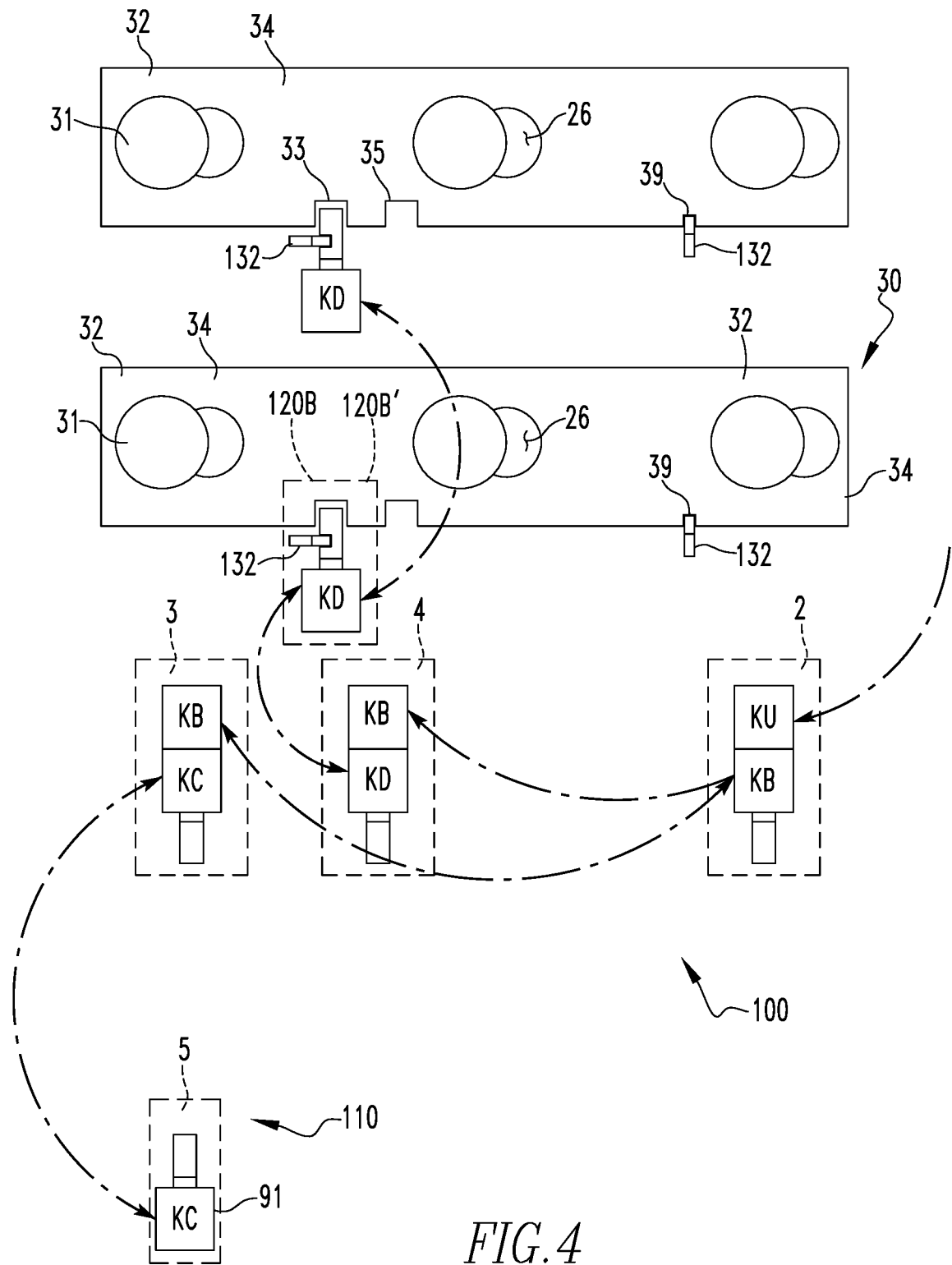
FIG. 4 is a schematic view of another embodiment of an interlock system.

In another embodiment, the interlock system 100 incorporates the interlock lock assembly 120, i.e., the pole shaft interlock lock assembly 120', with an existing lock which, as shown, is the third multi-purpose lock assembly 4. Thus, in this embodiment, the third multi-purpose lock assembly 4/interlock lock assembly 120 is hereinafter identified as the third multi-purpose/interlock lock assembly 120A (FIG. 3). It is understood that the physical elements of third multi-purpose/interlock lock assembly 120A are substantially similar to the embodiment of the interlock lock assembly 120 described above.

In this embodiment, with the exception of the third multi-purpose/interlock lock assembly 120A, the lock assemblies 102 operate in a manner similar to the prior art key system 1. For example, the third multi-purpose lock assembly 4 initially captures the second actuation key 9". Further, as in the prior art key system 1, the third multi-purpose lock assembly 4 is operatively coupled to both the mechanical control assembly open button 56 and the close button 58 (or a similar construct structured to close the separable contact assemblies 16). When the third multi-purpose lock assembly 4 is actuated, the third multi-purpose lock assembly blocking member 4B mechanically blocks the actuation of the mechanical control assembly open button 56. Further, initial actuation of the third dual-purpose lock assembly 4 actuates the close button 58 (or a similar construct structured to close the separable contact assemblies 16) and causes the separable contact assemblies 16 to close.

If the close button 58 (or a similar construct structured to close the separable contact assemblies 16) operates properly, the separable contact assemblies 16 are closed following actuation of the third multi-purpose lock assembly 4. If, however, an error occurs in the third multi-purpose/interlock lock assembly 120A or the closing assembly, the separable contact assemblies 16 could remain open. This is a problem.

Accordingly, the third multi-purpose/interlock lock assembly 120A includes the interlock lock assembly 120A, i.e., the pole shaft interlock lock assembly 120A'. That is, in this embodiment, linkage 130, shown schematically, operatively couples the pole shaft 21 and the third multi-purpose/interlock lock assembly 120A. In this embodiment, the operating mechanism pole shaft indicator 132 extends into a notch 124A in the second actuation key 9" (which is the key captured by the third multi-purpose/interlock lock assembly 120A). If the third multi-purpose/interlock lock assembly 120A and the closing assembly operate properly, the operating mechanism pole shaft indicator 132 is withdrawn from the second actuation key 9" upon actuation of the third multi-purpose/interlock lock assembly 120A. Thus, if there are no problems with the third multi-purpose/interlock lock assembly 120A and the closing assembly, the second actuation key 9" is removable from the third multi-purpose/interlock lock assembly 120A following actuation.

If, on the other hand, an error occurs and the separable contact assemblies 16 do not close following the actuation of the third multi-purpose/interlock lock assembly 120A, the third multi-purpose/interlock lock assembly 120A, prevents the removal of the second actuation key 9" from the third multi-purpose/interlock lock assembly 120A. Thus, the user must move the separable contact assemblies 16 to the closed position before removing the second actuation key 9" from the third multi-purpose/interlock lock assembly 120A. That is, manual actuation of the separable contact assemblies 16 positions the separable contact assemblies 16 in the closed position before the user can use the second actuation key 9" to actuate the second actuator lock assembly 6, i.e., before the user can open the shutter assembly 30 which is maintained in position by the second actuator lock assembly 6. This solves the problem(s) noted above.

Thus, in this embodiment, the interlock system 100 operates as follows, i.e., the procedure for moving the circuit breaker assembly 10 into a testing position and opening a shutter member 32 includes the following actions:

q. Utilizing first multi-purpose key 7 in first multi-purpose lock assembly 2 thereby placing the circuit breaker assembly 10 in the electrically disabled state and releasing the plurality multi-purpose key 8.

r. Utilizing the plurality multi-purpose key 8 in the second multi-purpose lock assembly 3 thereby opening the separable contact assemblies 16, moving the second multi-purpose lock assembly blocking member 3B into the path of the mechanical control assembly close button 58, and releasing the first actuation key 9'. It is noted that the separable contact assemblies 16 are open and cannot be closed by pressing the mechanical control assembly close button 58. Further, the operating mechanism pole shaft indicator 132 is moved into and extends through an opening in the interlock key 122. That is, the interlock key 122 is locked into the pole shaft interlock lock assembly 120'.

s. Utilizing the first actuation key 9' in first actuator lock assembly 5 thereby moving the first actuator lock assembly blocking member 5B out of the path of the carriage 46.

t. Moving the carriage 46, and therefore the circuit breaker assembly 10, into the enclosure 40. This places the circuit breaker assembly conductive members 24 in electrical communication with the enclosure line conductor and enclosure load conductor.

u. Returning the first actuation key 9' to the second multi-purpose lock assembly 3 and retuning the second multi-purpose lock assembly 3 to its initial state; i.e., releasing the plurality multi-purpose key 8 and moving the second dual-purpose lock assembly blocking member 3B out of the path of the mechanical control assembly close button 58. It is noted that the separable contact assemblies 16 are still open at this point in the procedure.

v. Utilizing the plurality multi-purpose key 8 in the third multi-purpose/interlock lock assembly 120A. If no errors occur, actuating the multi-purpose key 8 in the third multi-purpose/interlock lock assembly 120A causes the separable contact assemblies 16 to move into the closed position, moves the third dual-purpose lock assembly blocking member 4B into the path of the mechanical control assembly open button 56 and releases the second actuation key 9".

w. In the event that actuating the multi-purpose key 8 in the third multi-purpose/interlock lock assembly 120A does not cause the separable contact assemblies 16 to move into the closed position, i.e., if an error occurs, the third multi-purpose/interlock lock assembly 120A maintains the second actuation key 9" in the third multi-purpose/interlock lock assembly 120A. The user then manually closes the separable contact assemblies 16, e.g., by actuating the mechanical control assembly close button 58. Thus, the separable contact assemblies 16 are closed before the shutter member 32 can be moved. This is ensured by a reliable indicator because the second actuation key 9" used to release the shutter member 32 cannot be released from the third multi-purpose/interlock lock assembly 120A unless the pole shaft 21, i.e., the reliable indicator, is in the closed position.

x. Once the separable contact assemblies 16 are in the closed position, the second actuation key 9" is removed from the third multi-purpose/interlock lock assembly 120A.

y. Utilizing the second actuation key 9" in the second actuator lock assembly 6 thereby releasing the shutter member 32 to be moved into the second position.

At this point, testing probes (not shown) can be inserted through the shutter member 32 and the test ports 26 and into contact with the circuit breaker assembly conductive members 24. Because the second actuation key 9" used to actuate the shutter member 32 cannot be released unless the pole shaft 21, i.e., the reliable indicator, is in the closed position, the interlock system 100 ensures that the separable contact assemblies 16 are closed before the sliding shutter members 32 are movable. This solves the problem(s) stated above.

In a similar embodiment, the interlock system 100 incorporates an interlock lock assembly 120B, i.e., a pole shaft interlock lock assembly 120B' that is combined with the second actuator lock assembly 6. Thus, in this embodiment, the second actuator lock assembly/interlock lock assembly 120B is hereinafter identified as the second actuator/interlock lock assembly 120B. It is understood that the physical elements of second actuator/interlock lock assembly 120B include the linkage 130 and the operating mechanism pole shaft indicator 132 of the interlock lock assembly 120 described above, but the operation thereof is different, as described below. Further it is noted that the blocking member for the second actuator/interlock lock assembly 120B is still identified by reference number 6B.

In this embodiment, the second actuator/interlock lock assembly 120B, operates by preventing the rotation of the second actuation key 9" in the second actuator lock assembly 6. In a similar, but alternate embodiment (not shown), the second actuator/interlock lock assembly 120B, operates by preventing the insertion of the second actuation key 9" into the second actuator lock assembly 6. In the embodiment shown, the linkage 130 is structured to, and does, move the operating mechanism pole shaft indicator 132 between a first position, wherein the operating mechanism pole shaft indicator 132 blocks rotation of the second actuation key 9", and, a second position, wherein the operating mechanism pole shaft indicator 132 does not block rotation of the second actuation key 9". The positions of the operating mechanism pole shaft indicator 132 correspond to the positions of the separable contact assemblies 16 and the pole shaft 21. That is, when the separable contact assemblies 16 and the pole shaft 21 are in the first position, the operating mechanism pole shaft indicator 132 is in the first position blocking rotation of the second actuation key 9", and, when the separable contact assemblies 16 and the pole shaft 21 are in the second position, the operating mechanism pole shaft indicator 132 is in the second position and does not block rotation of the second actuation key 9". Stated alternately, the second actuator/interlock lock assembly 120B includes a pole shaft interlock assembly 120 structured to prevent actuation of the second actuator/interlock lock assembly 120B when the pole shaft 21 is in the first position, and, to allow actuation of the second actuator/interlock lock assembly 120B when the pole shaft 21 is in the second position.

In this embodiment, with the exception of the second actuator/interlock lock assembly 120B, the lock assemblies 102 operate in a manner similar to the prior art key system 1. It is again noted that second actuator/interlock lock assembly 120B is structured to, and does, move between a first configuration, wherein the second actuator lock assembly blocking member 6B is structured to block said shutter member 32 from moving between the first and second position, and, a second configuration, wherein the second actuator lock assembly blocking member 6B is structured to not block the shutter member 32 from moving between the first and second position. That is, the second actuator/interlock lock assembly 120B controls whether the shutter member 32 can be moved.

As noted above, if an error occurs, the separable contact assemblies 16 could be in the open position when the shutter member 32 is released. This is a problem. This embodiment, however, solves the problem because the second actuation key 9" cannot be inserted into the second actuator/interlock lock assembly 120B when the separable contact assemblies 16 and the pole shaft 21 are in the second position. If the second actuation key 9" cannot be inserted into the second actuator/interlock lock assembly 120B, the second actuator/interlock lock assembly 120B cannot be actuated thereby releasing the shutter member 32. Thus, the shutter member 32 cannot be released when the separable contact assemblies 16 are in the open position. This solves the problem(s) noted above.

If the third multi-purpose lock assembly 4 and the closing assembly operate properly, the operating mechanism pole shaft indicator 132 is withdrawn from second actuator/interlock lock assembly 120B upon actuation of the third multi-purpose lock assembly 4. Thus, if there are no problems with the third multi-purpose lock assembly 4 and the closing assembly, the second actuation key 9" can be inserted into the second actuator/interlock lock assembly 120B following actuation of the third multi-purpose lock assembly 4.

If, on the other hand, an error occurs and the separable contact assemblies 16 do not close following the actuation of the third multi-purpose lock assembly 4, the second actuator/interlock lock assembly 120B prevents the insertion of the second actuation key 9" into the second actuator lock assembly 6. Thus, the user must move the separable contact assemblies 16 to the closed position before inserting the second actuation key 9" into the second actuator/interlock lock assembly 120B. This positions the separable contact assemblies 16 in the closed position before the user can use the second actuation key 9" to actuate the second actuator/interlock lock assembly 120B, i.e., before the user can open the shutter assembly 30 which is maintained in position by the second actuator/interlock lock assembly 120B. This solves the problem(s) noted above.

Thus, in this embodiment, the interlock system 100 operates as follows, i.e., the procedure for moving the circuit breaker assembly 10 into a testing position and opening a shutter member 32 includes the following actions:

z. Utilizing first multi-purpose key 7 in first multi-purpose lock assembly 2 thereby placing the circuit breaker assembly 10 in the electrically disabled state and releasing the plurality multi-purpose key 8.

aa. Utilizing the plurality multi-purpose key 8 in the second multi-purpose lock assembly 3 thereby opening the separable contact assemblies 16, moving the second multi-purpose lock assembly blocking member 3B into the path of the mechanical control assembly close button 58, and releasing the first actuation key 9'. It is noted that the separable contact assemblies 16 are open and cannot be closed by pressing the mechanical control assembly close button 58. Further, the operating mechanism pole shaft indicator 132 is moved into and extends through an opening in the interlock key 122. That is, the interlock key 122 is locked into the pole shaft interlock lock assembly 120'.

bb. Utilizing the first actuation key 9' in first actuator lock assembly 5 thereby moving the first actuator lock assembly blocking member 5B out of the path of the carriage 46.

cc. Moving the carriage 46, and therefore the circuit breaker assembly 10, into the enclosure 40. This places the circuit breaker assembly conductive members 24 in electrical communication with the enclosure line conductor and enclosure load conductor.

dd. Returning the first actuation key 9' to the second multi-purpose lock assembly 3 and returning the second multi-purpose lock assembly 3 to its initial state; i.e., releasing the plurality multi-purpose key 8 and moving the second dual-purpose lock assembly blocking member 3B out of the path of the mechanical control assembly close button 58. It is noted that the separable contact assemblies 16 are still open at this point in the procedure.

ee. Utilizing the plurality multi-purpose key 8 in the third multi-purpose lock assembly 4 which moves the third dual-purpose lock assembly blocking member 4B into the path of the mechanical control assembly open button 56 and releases the second actuation key 9". Further, if no errors occur, actuation of the third multi-purpose lock assembly 4 also moves the separable contact assemblies 16 into the second position and causes the operating mechanism pole shaft indicator 132 to move into its second position wherein the key hole of the second actuator/interlock lock assembly 120B is not blocked.

ff. In the event that actuating the third multi-purpose lock assembly 4 does not cause the separable contact assemblies 16 to move into the closed position, i.e., if an error occurs, the second actuator/interlock lock assembly 120B maintains the operating mechanism pole shaft indicator 132 in the first position, i.e., blocking the insertion of the second actuation key 9" into the second actuator/interlock lock assembly 120B. If the user cannot insert the second actuation key 9" into the second actuator/interlock lock assembly 120B, the user manually closes the separable contact assemblies 16, e.g., by actuating the mechanical control assembly close button 58. Thus, the separable contact assemblies 16 are closed before the shutter member 32 can be moved. This is ensured by a reliable indicator because second actuation key 9" used to release the shutter member 32 cannot be inserted into the second actuator/interlock lock assembly 120B unless the pole shaft 21, i.e., the reliable indicator, is in the closed position.

gg. Utilizing the second actuation key 9" in the second actuator lock assembly 6 thereby releasing the shutter member 32 to be moved into the second position.

At this point, testing probes (not shown) can be inserted through the shutter member 32 and the test ports 26 and into contact with the circuit breaker assembly conductive members 24. Because the second actuation key 9" used to actuate the shutter member 32 cannot be inserted into the second actuator lock assembly 6 when the separable contact assemblies 16 are open, i.e., because the reliable indicator is in the first position, the interlock system 100 ensures that the separable contact assemblies 16 must be closed before the sliding shutter members 32 are movable. This solves the problem(s) stated above.

In another embodiment, the interlock system 100 includes a direct interlock with the shutter members 32. In this embodiment, the shutter members 32 include an interlock notch 39 (or opening, not shown). In this embodiment, the pole shaft interlock lock assembly linkage 130 is structured to, and does, position the operating mechanism pole shaft indicator 132 adjacent the shutter members 32 and the shutter member interlock notch 39. In this embodiment, the operating mechanism pole shaft indicator 132 is structured to move between a first position, wherein the operating mechanism pole shaft indicator 132 is disposed within the shutter member interlock notch 39 and prevents movement of the shutter member 32, and, a second position, wherein the operating mechanism pole shaft indicator 132 is not disposed within the shutter member interlock notch 39 and does not prevent movement of the shutter member 32.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. An interlock system for an electrical installation, said electrical installation including a circuit breaker assembly and an enclosure, said circuit breaker assembly including a housing assembly, a number of contact assemblies, an operating mechanism, a motor assembly, a conductor assembly, a number of test ports, and a shutter assembly, said enclosure defining a substantially enclosed space and including a carriage and a number of rails, said carriage movably coupled to said rails and structured to move between an exposed, first position wherein said carriage is disposed substantially outside said enclosure enclosed space, and, an enclosed, second position, wherein said carriage is substantially disposed within said enclosure enclosed space, said circuit breaker housing assembly coupled to said carriage and structured to move therewith, said circuit breaker housing assembly defining a generally enclosed space, said number of contact assemblies and said conductor assembly substantially disposed in said circuit breaker housing assembly enclosed space, each said contact assembly including a movable contact and an associated fixed contact, each said movable contact structured to move between an open, first position, wherein each said movable contact is spaced from, and not in electrical communication with, said associated fixed contact, and, a closed, second position, wherein each said movable contact is directly coupled to, and in electrical communication with, said associated fixed contact, said operating mechanism including a pole shaft, said operating mechanism pole shaft operatively coupled to said number of contact assemblies and structured to move between a first position and a second position, wherein said number of contact assemblies move between said first position and said second position corresponding to the position of said operating mechanism pole shaft, said motor assembly operatively coupled to said operating mechanism and structured to move said operating mechanism pole shaft between said first position and said second position, said conductor assembly including a number of conductor members, wherein each conductor member is in electrical communication with one contact assembly, each said test port structured to provide access through said circuit breaker housing assembly to one conductor member, said shutter assembly including a shutter member, said shutter member including a body with a number of impassible portions and a number of passages, said shutter member movably coupled to said circuit breaker housing assembly at said test ports, said shutter member structured to move between a first position, wherein each impassible portion is disposed over an associated test port, and, a second position, wherein each passage is disposed over an associated test port, said interlock system comprising:
- a number of lock assemblies;
- a number of keys, each key associated with at least one lock assembly;
- said number of lock assemblies including a number of actuator lock assemblies and a number of multi-purpose lock assemblies;
- said number of keys including a number of actuator keys and a number of multi-purpose keys;
- wherein at least one lock assembly is operatively coupled to a reliable indicator of the position of said separable contact assemblies;
- said number of lock assemblies includes a number of interlock lock assemblies;
- said number of keys includes a number of interlock keys; and
- wherein said number of interlock lock assemblies includes a pole shaft interlock lock assembly.

2. The interlock system of claim 1 wherein each interlock lock assembly is one of a passive interlock lock assembly or an active interlock lock assembly.

3. The interlock system of claim 1 wherein:
- said pole shaft interlock lock assembly is structured to be coupled to said circuit breaker housing assembly;
- said pole shaft interlock lock assembly is a passive interlock lock assembly structured to capture a second multi-purpose key; and
- said pole shaft interlock lock assembly is structured to be engaged by an operating mechanism pole shaft indicator when said operating mechanism pole shaft is in said first position.

4. The interlock system of claim 1 wherein:
- said number of multi-purpose lock assemblies includes a first multi-purpose lock assembly, a second multi-purpose lock assembly, a third multi-purpose lock assembly, and an interlock lock assembly;
- said number of actuator lock assemblies includes a first actuator lock assembly, and a second actuator lock assembly;
- said number of keys includes a first multi-purpose key, a plurality multi-purpose key, a third multi-purpose key, a first actuator key and a second actuator key;
- said first multi-purpose lock assembly is structured to capture said plurality multi-purpose key and perform a primary circuit breaker function;
- said second multi-purpose lock assembly is structured to capture said first actuator key;
- said interlock lock assembly includes a pole shaft interlock assembly structured to capture a third multi-purpose key when said pole shaft is in said first position, and, to release said third multi-purpose key when said pole shaft is in said second position;
- said interlock lock assembly is structured to capture said third multi-purpose key;
- said first actuator lock assembly includes a blocking member, said first actuator lock assembly structured to move between a first configuration, wherein said first actuator lock assembly blocking member is structured to block said carriage from moving over said rails, and, a second configuration, wherein said first actuator lock assembly blocking member is not structured to block said carriage from moving over said rails;
- said second actuator lock assembly includes a blocking member, said second actuator lock assembly structured to move between a first configuration, wherein said second actuator lock assembly blocking member is structured to block said shutter member from moving between said first and second position, and, a second configuration, wherein said second actuator lock assembly blocking member is structured to not block said shutter member from moving between said first and second position;
- said first multi-purpose key structured to actuate said first multi-purpose lock assembly;
- said plurality multi-purpose key structured to actuate said second multi-purpose lock assembly and said interlock lock assembly;
- said third multi-purpose key structured to actuate said third multi-purpose lock assembly;
- said first actuator key structured to engage said first actuator lock assembly and to move said first actuator lock assembly between said first and second configuration; and
- said second actuator key structured to actuate said second actuator lock assembly and to move said second actuator lock assembly between said first and second configuration.

5. The interlock system of claim 1 wherein:
- said number of multi-purpose lock assemblies includes a second multi-purpose lock assembly and a third multi-purpose/interlock lock assembly;
- said number of actuator lock assemblies includes a first actuator lock assembly, and a second actuator lock assembly;
- said number of keys includes a first multi-purpose key, a plurality multi-purpose key, a first actuator key and a second actuator key;
- said first multi-purpose lock assembly is structured to capture said plurality multi-purpose key and to perform a primary circuit breaker function;
- said second multi-purpose lock assembly is structured to capture said first actuator key;
- said third multi-purpose/interlock lock assembly is structured to capture said second actuator key; and
- said third multi-purpose/interlock lock assembly includes a pole shaft interlock assembly structured to capture said second actuator key when said pole shaft is in said first position, and, to release said second actuator key when said pole shaft is in said second position;
- said first actuator lock assembly including a blocking member, said first actuator lock assembly structured to move between a first configuration, wherein said first actuator lock assembly blocking member is structured to block said carriage from moving over said rails, and, a second configuration, wherein said first actuator lock assembly blocking member is not structured to block said carriage from moving over said rails;
- said second actuator lock assembly including a blocking member, said second actuator lock assembly structured to move between a first configuration, wherein said second actuator lock assembly blocking member is structured to block said shutter member from moving between said first and second position, and, a second configuration, wherein said second actuator lock assembly blocking member is structured to not block said shutter member from moving between said first and second position;
- said first multi-purpose key structured to actuate said first multi-purpose lock assembly;
- said plurality multi-purpose key structured to actuate said second multi-purpose lock assembly and said third multi-purpose/interlock lock assembly;

said first actuator key structured to engage said first actuator lock assembly and to move said first actuator lock assembly between said first and second configuration; and said second actuator key structured to actuate said second actuator lock assembly and to move said second actuator lock assembly between said first and second configuration.

6. The interlock system of claim 1 wherein:

said number of multi-purpose lock assemblies includes a second multi-purpose lock assembly and a third multi-purpose lock assembly;

said number of actuator lock assemblies includes a first actuator lock assembly, and a second actuator/interlock lock assembly;

said number of keys includes a first multi-purpose key, a plurality multi-purpose key, a first actuator key and a second actuator key;

said first multi-purpose lock assembly is structured to capture said plurality multi-purpose key and to perform a primary circuit breaker function;

said second multi-purpose lock assembly is structured to capture said first actuator key;

said third multi-purpose lock assembly is structured to capture said second actuator key;

said first actuator lock assembly including a blocking member, said first actuator lock assembly structured to move between a first configuration, wherein said first actuator lock assembly blocking member is structured to block said carriage from moving over said rails, and, a second configuration, wherein said first actuator lock assembly blocking member is not structured to block said carriage from moving over said rails;

said second actuator/interlock lock assembly including a blocking member, said second actuator lock assembly structured to move between a first configuration, wherein said second actuator/interlock lock assembly blocking member is structured to block said shutter member from moving between said first and second position, and, a second configuration, wherein said second actuator/interlock lock assembly blocking member is structured to not block said shutter member from moving between said first and second position;

said second actuator/interlock lock assembly further including a pole shaft interlock assembly structured to prevent actuation of said second actuator/interlock lock assembly when said pole shaft is in said first position, and, to allow actuation of said second actuator/interlock lock assembly when said pole shaft is in said second position;

said first multi-purpose key structured to actuate said first multi-purpose lock assembly;

said plurality multi-purpose key structured to actuate said second multi-purpose lock assembly and said third multi-purpose lock assembly;

said first actuator key structured to engage said first actuator lock assembly and to move said first actuator lock assembly between said first and second configuration; and said second actuator key structured to actuate said second actuator lock assembly.

7. An electrical installation comprising:

a circuit breaker assembly including a housing assembly, a number of contact assemblies, an operating mechanism, a conductor assembly, a number of test ports, and a shutter assembly;

an enclosure defining a substantially enclosed space and including a carriage and a number of rails;

said carriage movably coupled to said rails and structured to move between an exposed, first position wherein said carriage is disposed substantially outside said enclosure enclosed space, and, an enclosed, second position, wherein said carriage is substantially disposed within said enclosure enclosed space;

said circuit breaker housing assembly coupled to said carriage and structured to move therewith;

said circuit breaker housing assembly defining a generally enclosed space;

said number of contact assemblies and said conductor assembly substantially disposed in said circuit breaker housing assembly enclosed space;

each said contact assembly including a movable contact and an associated fixed contact, each said movable contact structured to move between an open, first position, wherein each said movable contact is spaced from, and not in electrical communication with, said associated fixed contact, and, a closed, second position, wherein each said movable contact is directly coupled to, and in electrical communication with, said associated fixed contact;

said operating mechanism including a motor assembly and a pole shaft;

said operating mechanism pole shaft operatively coupled to said number of contact assemblies and structured to move between a first position and a second position, wherein said number of contact assemblies move between said first position and said second position corresponding to the position of said operating mechanism pole shaft;

said motor assembly operatively coupled to said operating mechanism pole shaft and structured to move said operating mechanism pole shaft between said first position and said second position;

said conductor assembly including a number of conductor members, wherein each conductor member is in electrical communication with one contact assembly;

each said test port structured to provide access through said circuit breaker housing assembly to one conductor member;

said shutter assembly including a shutter member;

said shutter member including a body with a number of impassible portions and a number of passages;

said shutter member movably coupled to said circuit breaker housing assembly at said test ports;

said shutter member structured to move between a first position, wherein each impassible portion is disposed over an associated test port, and, a second position, wherein each passage is disposed over an associated test port;

said interlock system including a number of lock assemblies and a number of keys, each key associated with at least one lock assembly;

said number of lock assemblies including a number of multi-purpose lock assemblies and a number of actuator lock assemblies;

said number of keys including a number of multi-purpose keys and a number of actuator keys;

said number of multi-purpose lock assemblies includes a number of interlock lock assemblies;

said number of multi-purpose keys includes a number of interlock keys;

said number of interlock lock assemblies includes a pole shaft interlock lock assembly; and said pole shaft interlock lock assembly is one of a passive interlock lock assembly associated with said operating mechanism pole shaft, or, an active interlock lock assembly operatively coupled to said operating mechanism pole shaft.

8. The electrical installation of claim 7 wherein said pole shaft interlock lock assembly is one of a multi-purpose interlock lock assembly or an actuator interlock lock assembly.

9. The electrical installation of claim 7 wherein:
said pole shaft interlock lock assembly is structured to be coupled to said circuit breaker housing assembly;
said pole shaft interlock lock assembly is a passive interlock lock assembly structured to capture a second multi-purpose key; and
said pole shaft interlock lock assembly is structured to be engaged by an operating mechanism pole shaft indicator when said operating mechanism pole shaft is in said first position.

10. The electrical installation of claim 7 wherein:
said number of multi-purpose lock assemblies includes a first multi-purpose lock assembly, a second multi-purpose lock assembly, a third multi-purpose lock assembly, and an interlock lock assembly;
said number of actuator lock assemblies includes a first actuator lock assembly, and a second actuator lock assembly;
said number of keys includes a first multi-purpose key, a plurality multi-purpose key, a third multi-purpose key, a first actuator key and a second actuator key;
said first multi-purpose lock assembly is structured to capture said plurality multi-purpose key and perform a primary circuit breaker function;
said second multi-purpose lock assembly is structured to capture said first actuator key;
said interlock lock assembly includes a pole shaft interlock assembly structured to capture a third multi-purpose key when said pole shaft is in said first position, and, to release said third multi-purpose key when said pole shaft is in said second position;
said interlock lock assembly is structured to capture said third multi-purpose key;
said first actuator lock assembly includes a blocking member, said first actuator lock assembly structured to move between a first configuration, wherein said first actuator lock assembly blocking member is structured to block said carriage from moving over said rails, and, a second configuration, wherein said first actuator lock assembly blocking member is not structured to block said carriage from moving over said rails;
said second actuator lock assembly includes a blocking member, said second actuator lock assembly structured to move between a first configuration, wherein said second actuator lock assembly blocking member is structured to block said shutter member from moving between said first and second position, and, a second configuration, wherein said second actuator lock assembly blocking member is structured to not block said shutter member from moving between said first and second position;
said first multi-purpose key structured to actuate said first multi-purpose lock assembly;
said plurality multi-purpose key structured to actuate said second multi-purpose lock assembly and said interlock lock assembly;
said third multi-purpose key structured to actuate said third multi-purpose lock assembly;

said first actuator key structured to engage said first actuator lock assembly and to move said first actuator lock assembly between said first and second configuration; and
said second actuator key structured to actuate said second actuator lock assembly and to move said second actuator lock assembly between said first and second configuration.

11. The electrical installation of claim 7, wherein:
said number of multi-purpose lock assemblies includes a second multi-purpose lock assembly and a third multi-purpose/interlock lock assembly;
said number of actuator lock assemblies includes a first actuator lock assembly, and a second actuator lock assembly;
said number of keys includes a first multi-purpose key, a plurality multi-purpose key, a first actuator key and a second actuator key;
said first multi-purpose lock assembly is structured to capture said plurality multi-purpose key and to perform a primary circuit breaker function;
said second multi-purpose lock assembly is structured to capture said first actuator key;
said third multi-purpose/interlock lock assembly is structured to capture said second actuator key; and
said third multi-purpose/interlock lock assembly includes a pole shaft interlock assembly structured to capture said second actuator key when said pole shaft is in said first position, and, to release said second actuator key when said pole shaft is in said second position,
said first actuator lock assembly including a blocking member, said first actuator lock assembly structured to move between a first configuration, wherein said first actuator lock assembly blocking member is structured to block said carriage from moving over said rails, and, a second configuration, wherein said first actuator lock assembly blocking member is not structured to block said carriage from moving over said rails;
said second actuator lock assembly including a blocking member, said second actuator lock assembly structured to move between a first configuration, wherein said second actuator lock assembly blocking member is structured to block said shutter member from moving between said first and second position, and, a second configuration, wherein said second actuator lock assembly blocking member is structured to not block said shutter member from moving between said first and second position;
said first multi-purpose key structured to actuate said first multi-purpose lock assembly;
said plurality multi-purpose key structured to actuate said second multi-purpose lock assembly and said third multi-purpose/interlock lock assembly;
said first actuator key structured to engage said first actuator lock assembly and to move said first actuator lock assembly between said first and second configuration; and
said second actuator key structured to actuate said second actuator lock assembly and to move said second actuator lock assembly between said first and second configuration.

12. The electrical installation of claim 7 wherein:
said number of multi-purpose lock assemblies includes a second multi-purpose lock assembly and a third multi-purpose lock assembly;

said number of actuator lock assemblies includes a first actuator lock assembly, and a second actuator/interlock lock assembly;

said number of keys includes a first multi-purpose key, a plurality multi-purpose key, a first actuator key and a second actuator key;

said first multi-purpose lock assembly is structured to capture said plurality multi-purpose key and to perform a primary circuit breaker function;

said second multi-purpose lock assembly is structured to capture said first actuator key;

said third multi-purpose lock assembly is structured to capture said second actuator key;

said first actuator lock assembly including a blocking member, said first actuator lock assembly structured to move between a first configuration, wherein said first actuator lock assembly blocking member is structured to block said carriage from moving over said rails, and, a second configuration, wherein said first actuator lock assembly blocking member is not structured to block said carriage from moving over said rails;

said second actuator lock assembly including a blocking member, said second actuator lock assembly structured to move between a first configuration, wherein said second actuator/interlock lock assembly blocking member is structured to block said shutter member from moving between said first and second position, and, a second configuration, wherein said second actuator lock assembly blocking member is structured to not block said shutter member from moving between said first and second position;

said second actuator lock assembly further including a pole shaft interlock assembly structured to prevent actuation of said second actuator lock assembly when said pole shaft is in said first position, and, to allow actuation of said second actuator/interlock lock assembly when said pole shaft is in said second position;

said first multi-purpose key structured to actuate said first multi-purpose lock assembly;

said plurality multi-purpose key structured to actuate said second multi-purpose lock assembly and said third multi-purpose lock assembly;

said first actuator key structured to engage said first actuator lock assembly and to move said first actuator lock assembly between said first and second configuration; and said second actuator key structured to actuate said second actuator lock assembly.

* * * * *